(12) United States Patent
Aranguren et al.

(10) Patent No.: US 8,561,033 B2
(45) Date of Patent: Oct. 15, 2013

(54) SELECTIVE BRANCH-TRIGGERED TRACE GENERATION APPARATUS AND METHOD

(75) Inventors: Herman Aranguren, Tucson, AZ (US); David Charles Reed, Tucson, AZ (US); Max Douglas Smith, Tucson, AZ (US); David Bruce LeGendre, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 12/847,993

(22) Filed: Jul. 30, 2010

(65) Prior Publication Data
US 2012/0030521 A1 Feb. 2, 2012

(51) Int. Cl.
*G06F 9/44* (2006.01)
(52) U.S. Cl.
USPC ........................................................ 717/128
(58) Field of Classification Search
None
See application file for complete search history.

(56) References Cited

U.S. PATENT DOCUMENTS

| | | | | |
|---|---|---|---|---|
| 5,179,696 A * | 1/1993 | Shouda | ............................ | 714/25 |
| 5,652,889 A * | 7/1997 | Sites | ............................ | 717/144 |
| 5,978,902 A * | 11/1999 | Mann | ............................ | 712/227 |
| 6,009,270 A * | 12/1999 | Mann | ............................ | 717/128 |
| 6,094,729 A * | 7/2000 | Mann | ............................ | 714/25 |
| 6,142,683 A * | 11/2000 | Madduri | ............................ | 717/128 |
| 6,145,123 A * | 11/2000 | Torrey et al. | ............................ | 717/128 |
| 6,148,437 A * | 11/2000 | Shah et al. | ............................ | 717/128 |
| 6,161,200 A * | 12/2000 | Rees et al. | ............................ | 714/38.13 |
| 6,182,208 B1 * | 1/2001 | Peri et al. | ............................ | 712/227 |
| 6,327,704 B1 * | 12/2001 | Mattson et al. | ............................ | 717/153 |
| 6,351,844 B1 * | 2/2002 | Bala | ............................ | 717/128 |
| 7,065,749 B2 * | 6/2006 | Watanabe | ............................ | 717/128 |
| 7,120,685 B2 * | 10/2006 | Ullmann et al. | ............................ | 709/224 |
| 7,149,926 B2 * | 12/2006 | Ahmad et al. | ............................ | 714/30 |
| 7,743,143 B2 * | 6/2010 | Belgaied | ............................ | 709/225 |
| 7,844,859 B2 * | 11/2010 | Accapadi et al. | ............................ | 714/45 |
| 7,865,879 B1 * | 1/2011 | Kommrusch et al. | ............................ | 717/124 |
| 8,024,620 B2 * | 9/2011 | Moyer | ............................ | 717/124 |
| 8,108,839 B2 * | 1/2012 | Clark | ............................ | 717/128 |
| 2001/0054175 A1 * | 12/2001 | Watanabe | ............................ | 717/4 |
| 2003/0056200 A1 * | 3/2003 | Li et al. | ............................ | 717/128 |
| 2003/0088854 A1 * | 5/2003 | Wygodny et al. | ............................ | 717/130 |
| 2003/0192034 A1 * | 10/2003 | Hayase | ............................ | 717/128 |
| 2005/0223368 A1 * | 10/2005 | Smith et al. | ............................ | 717/128 |
| 2007/0294592 A1 * | 12/2007 | Ashfield et al. | ............................ | 714/45 |
| 2008/0134148 A1 * | 6/2008 | Clark | ............................ | 717/128 |
| 2008/0141226 A1 * | 6/2008 | Girouard et al. | ............................ | 717/128 |
| 2009/0113239 A1 * | 4/2009 | Accapadi et al. | ............................ | 714/15 |
| 2009/0204947 A1 | 8/2009 | Barker et al. | | |
| 2010/0005316 A1 * | 1/2010 | LeGendre et al. | ............................ | 713/189 |
| 2010/0023811 A1 * | 1/2010 | Moyer | ............................ | 714/47 |

* cited by examiner

*Primary Examiner* — Brett Feeney
(74) *Attorney, Agent, or Firm* — Nelson and Nelson; Daniel P. Nelson; Alexis V. Nelson

(57) ABSTRACT

A method for selectively generating trace data is disclosed. Such a method includes executing a first module on a processor. The processor is operably coupled to a memory storing the first module and one or more branch modules. The method further includes detecting the execution of an instruction of the first module to execute a branch module. In response to detecting execution of the instruction, traces of branch modules subsequently executed by the processor are generated. Upon detecting a return of execution by the processor to the first module, the generation of traces is terminated and a trace report is generated. A corresponding apparatus and computer program product are also disclosed herein.

17 Claims, 5 Drawing Sheets

SELECTIVE BRANCH-TRIGGERED TRACE GENERATION APPARATUS AND METHOD

BACKGROUND

1. Field of the Invention

This invention relates to apparatus and methods for generating trace data for debugging a software module.

2. Background of the Invention

Modern software is written in a modular fashion with each module having a specific functionality and having specific interfaces for interacting with other modules. In this manner, each module can be written and tested separately, enabling multiple developers to work in parallel on a larger software system. Modular software also advantageously allows an existing module to be incorporated into multiple larger systems. One difficulty of modular software is that each module may have a different author or be provided by a different entity having different programming conventions. It is therefore critical to test the interaction between software modules to ensure that a software system behaves as expected.

In some software systems, an existing module is adapted for use in a software system by intercepting a call to the module and executing an intermediate module that performs additional processing, which may include modifying parameters that are passed to the module. The intermediate module then invokes the module. Such a system advantageously allows for reuse of existing modules but presents difficulty for the testing and debugging of the software system. For example, it may be difficult to determine why an instruction in a software system to invoke a function of the module does not function as predicted when the identity of the intermediate module is not apparent from the source code of the module.

Debugging systems provide the ability to generate a system trace that records all function calls made by a software system or module. However, these traces include large amounts of data that is not readily interpretable to evaluate the behavior of the software system.

In view of the foregoing, it would be an advance in the art to provide an apparatus and method for selectively generating trace data in order to detect and debug interactions between separate software modules in a software system.

SUMMARY

The invention has been developed in response to the present state of the art and, in particular, in response to the problems and needs in the art that have not yet been fully solved by currently available apparatus and methods. Accordingly, the invention has been developed to provide apparatus and methods for selective trace generation. The features and advantages of the invention will become more fully apparent from the following description and appended claims, or may be learned by practice of the invention as set forth hereinafter.

Consistent with the foregoing, a method for selectively generating trace data is disclosed. Such a method includes executing a first module on a processor. The processor is operably coupled to a memory storing the first module and one or more branch modules. The method further includes detecting the execution of an instruction of the first module to execute a branch module. In response to detecting execution of the instruction, traces of branch modules subsequently executed by the processor are generated. Upon detecting a return of execution by the processor to the first module, the generation of traces is terminated and a trace report is generated. A corresponding apparatus and computer program product are also disclosed herein.

The trace report may include trace records, which may include a portion of the branch modules executed and the values stored in registers of the processor at the time the branch modules were executed.

In certain embodiments, detecting execution of a branch instruction may include detecting a change in the value of a base register of the processor pointing to the base address of a currently executing module. Detecting return of execution to the first module may include detecting correspondence between a watch register and a status address stored in a status register of the processor. The watch register may have written thereto a return address corresponding to the instruction following the branch instruction that triggered initiation of the generation of trace records.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
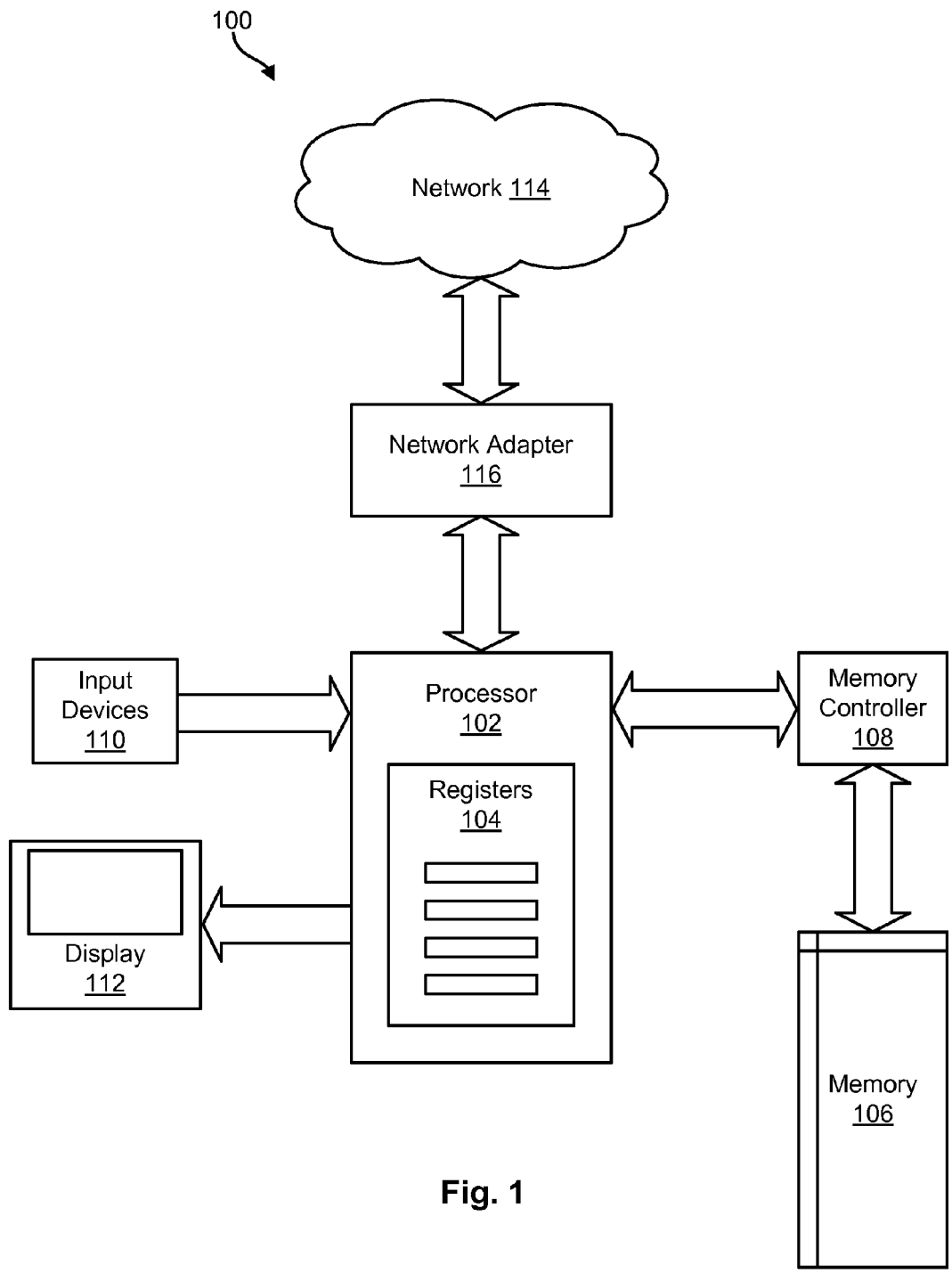
FIG. 1 is a high-level block diagram showing one example of a computer system suitable for use with an embodiment of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown.

The computer system 100 includes at least one processor 102 and may include more than one processor. The processor 102 includes one or more registers 104 storing data describing the state of the processor and facilitating execution of software systems. The registers 104 may be internal to the processor or may be stored in a memory 106. The memory 106 stores operational and executable data that is operated upon by the processor 102, such as software modules undergoing a testing and debugging process. The memory 106 may be accessed by the processor by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
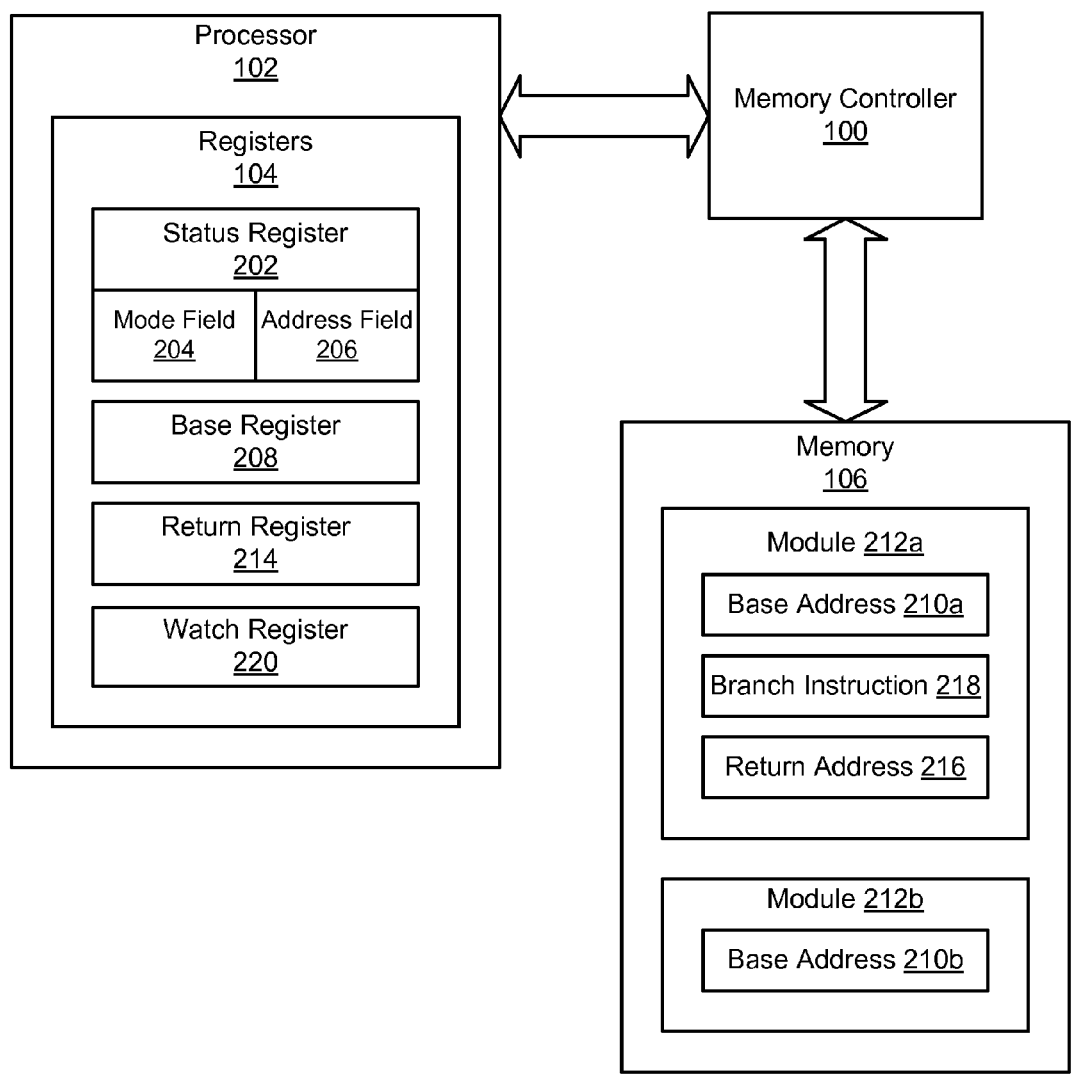
FIG. 2 is a high-level block diagram showing a processor operably coupled to a memory storing a plurality of software modules suitable for use with an embodiment of the invention.

Referring to FIG. 2, in certain embodiments, the registers 104 of the processor 102 may include a status register 202 indicating the status of a currently executing module. The status register 202 may include a mode field 204 and an address field 206. The mode field 204 contains one or more flags instructing the processor how to process instructions of a currently executed module. In one embodiment of the invention, the mode field 204 includes a flag indicating that a debug mode is either on or off. The response of the processor to the status of the debug mode flag is described hereinafter. The address field 206 contains an address of a currently executed instruction of the currently executing module and is updated following execution of an instruction to point to the next instruction in the currently executing software module.

The registers 104 may further include a base register 208 containing a base address 210a of a currently executing module 212a. The base address 210a may indicate the location of the first instruction of the module 212a within the memory 106. When a second module 212b is executed, either within or following execution of the first module 212a, the base register 208 may be updated to point to the base address 210b of the second module 212b.

The registers 104 may further include a return register 214 used for storing a return address 216 of a module, such as the module 212a. A module 212a may include a branch instruction 218 invoking a second module 212b, i.e. a "branching instruction." Upon invoking the second module 212b, the address of the instruction following the branching instruction at address 218 may be stored in the return register to enable resumption of execution of the first module 212a following completion of execution of the second module 212b.

The registers 104 may further include a watch register 220. The watch register 220 stores an address specified by user or a debugging or monitoring program. When the status address field 206 is equal to the address stored in the watch register 220, the debugging or monitoring program may then be invoked by the processor 102 to perform a programmed function.

Figure 3:
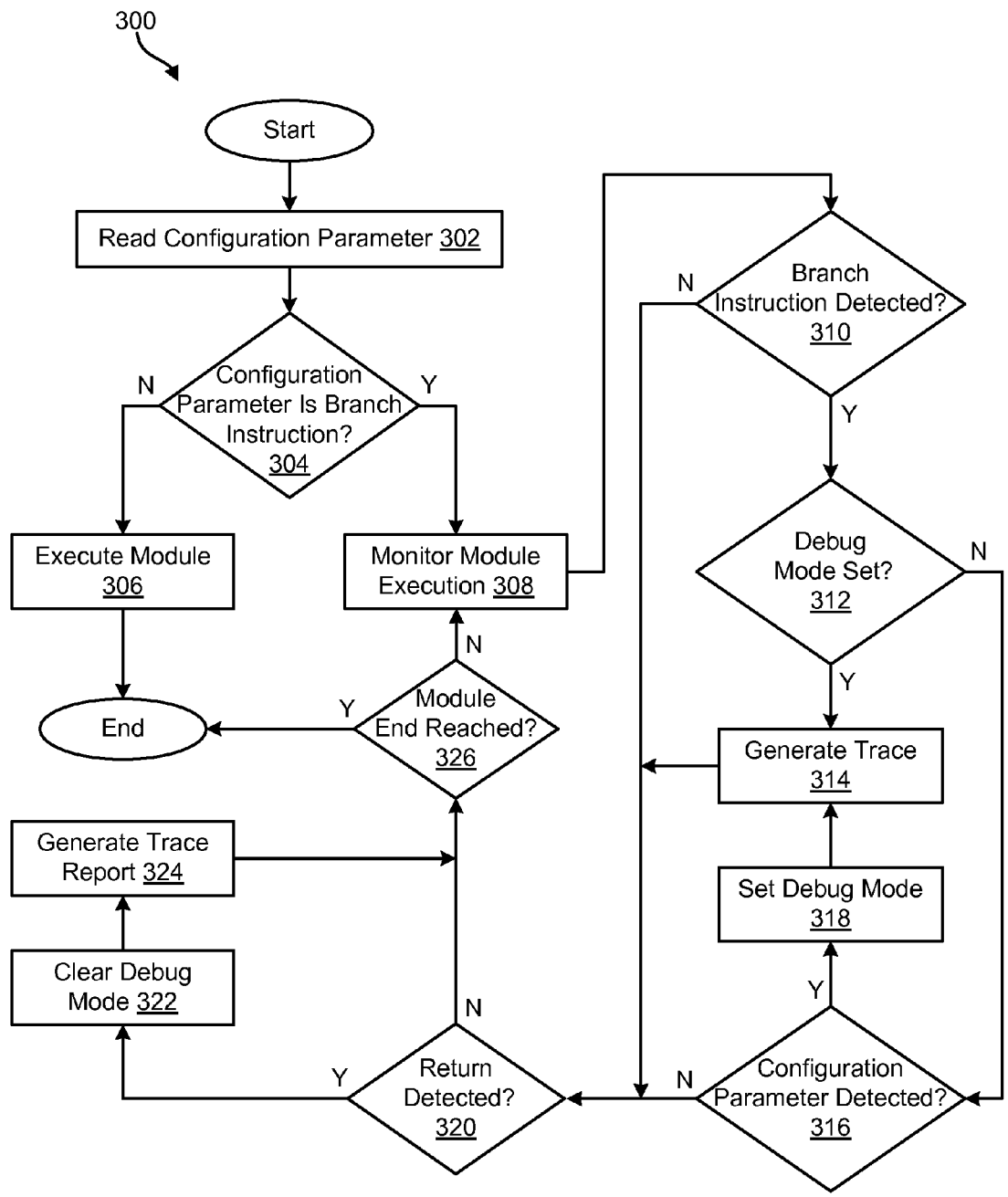
FIG. 3 is a process flow diagram showing one embodiment of a method for selectively generating trace data.

Referring to FIG. 3, one embodiment of a method 300 for generating trace data describing execution of a subject module is illustrated. For purposes of this disclosure "subject module" refers to a module that is being debugged, tested, or analyzed using the methods and apparatus described herein. At step 302, a configuration parameter is read. The configuration parameter specifies one or more instructions that will be used to initiate the generation of trace data during execution of the subject module. The configuration parameter may be read from a file or specified as a parameter when the subject module is invoked, when a debugging program is invoked, or at some point during execution of either the module or debugging program. In yet another embodiment, the configuration parameter may be an environment variable of an operating environment such as a shell or operating system in which the module or debugging program executes.

At step 304, the configuration parameter may be evaluated to determine whether the configuration parameter includes one or more branch instructions. A branching instruction may include an instruction invoking another module, an instruction invoking a segment of a multi-segment subject module, or an instruction invoking a function within the subject module. In some embodiments, only certain types of branching instructions may be suitable for generating trace data. Accordingly, in such embodiments, step 304 may include evaluating the configuration parameter to determine if the configuration parameter is both a branching instruction and a qualified branching instruction.

In order to generate data relevant to interaction of different software modules, such as those from different vendors or authors, it may be advantageous to limit the types of instructions that can trigger generation of trace data to those that are likely to be invoked when invoking another software module. Accordingly, the configuration parameter may indicate that trace data is to be generated only for function calls corresponding to invocation of modules external to the subject module in order to only generate trace data useful for evaluating interoperability of the subject module and one or more external modules. In some processors, instructions corresponding to assembler instructions SVC and PC, or their equivalents, are executed when calling a module external to a subject module. Other instructions such as those corresponding to assembler instructions BALR and BAKR, or their equivalents, may also indicate branching to another module. Other processor instructions resulting in branching may also be used as the configuration parameter such as BC, BCR, BAL, BAS, BASR, BASSM, BSM, BRAS, and BRC, or their equivalents.

In some embodiments, a user or program may specify a configuration parameter indicating that all branching instructions should be enabled to trigger trace generation. In these instances, trace generation may be triggered whenever the value stored in the base register 208 changes.

If the configuration parameter is determined not to be a branching instruction and/or a qualified branching instruction at step 302, then the subject module may be permitted to execute to completion at step 306 without the generation of trace data in accordance with the method 300. Of course, other methods for generation of trace data could be used to evaluate execution of the subject module at step 306.

If the configuration parameter is determined to be a branching instruction and/or a qualified branching instruction, then at step 308 the subject module is allowed to commence execution while being monitored for execution of a branching instruction specified by the configuration parameter.

Some or all of the instructions of the subject module and instructions of other modules invoked by the subject module may be evaluated at step 310 to determine whether they are branching instructions. Step 310 may further include evaluating whether the branching instruction is a qualified branching instruction corresponding to those specified in the configuration parameter. Alternatively, step 310 may include evaluating whether a branching instruction belongs to a configurable or hard-coded list of branching instructions corresponding to calls for execution of an external module or service. In some embodiments, the configuration parameter includes two sets of branching instructions each containing zero or more branching instructions, a first set may indicate those branching instructions that will turn on the debugging mode and initiate trace generation and the second set indicating those that will be determined to be qualified branching instructions at step 310.

Figure 4A:
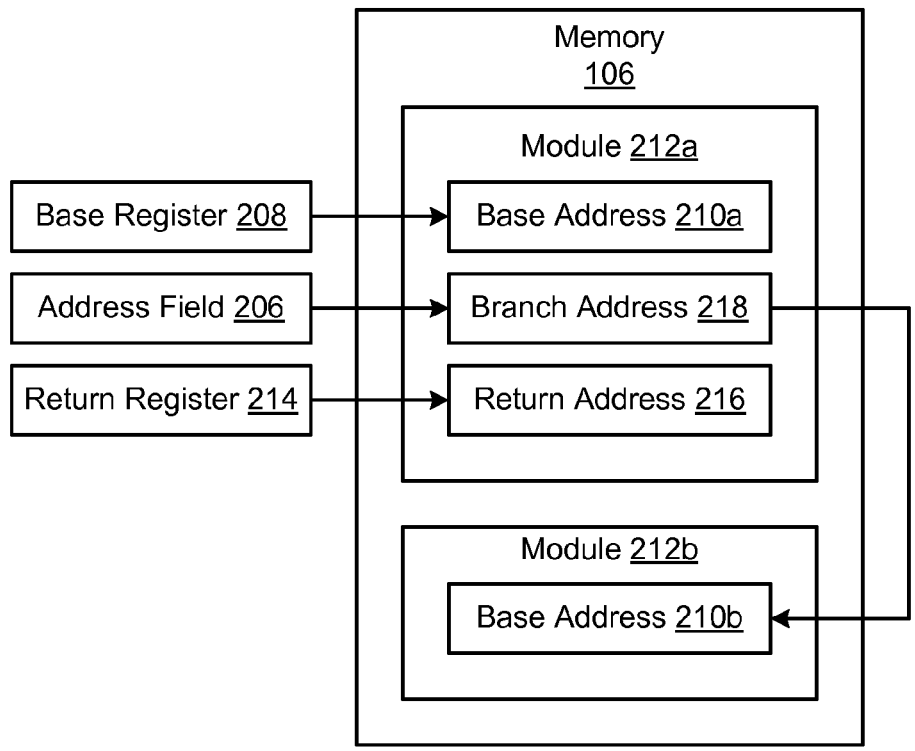
FIGS. 4A through 4C are block diagrams illustrating a relationship between processor registers and a memory during performance of one embodiment of a method in accordance with the invention.
Figure 4B:
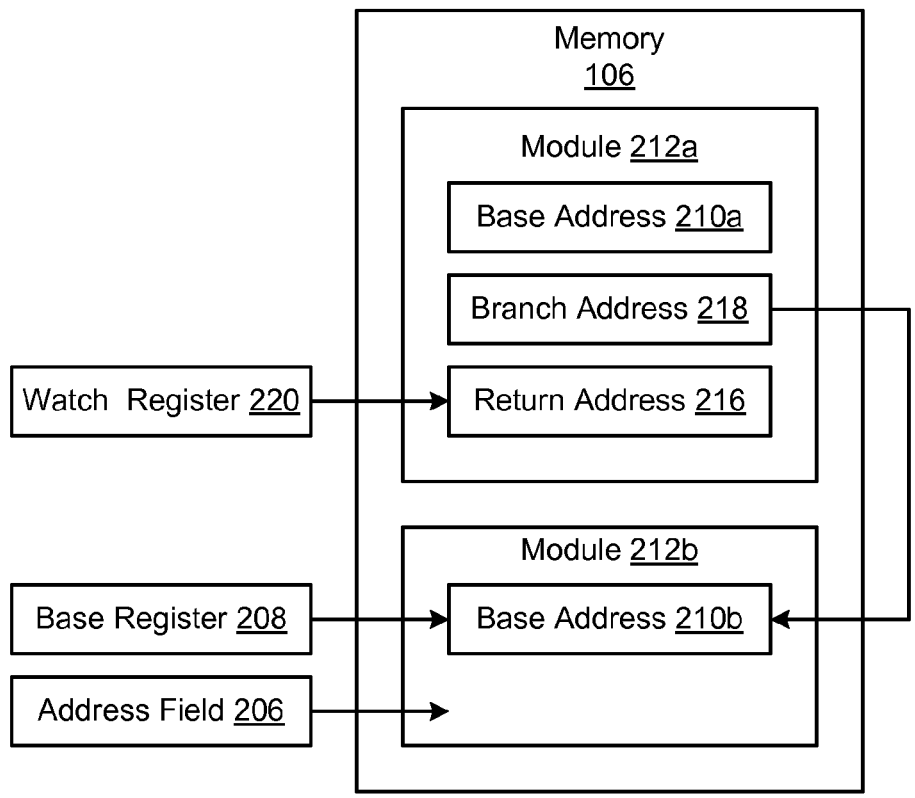

Referring to FIGS. 4A and 4B, while still referring to FIG. 3, step 310 may take advantage of the registers 104 of the processor 102. Referring specifically to FIG. 4A, when a subject module 212a is executed, the base register 208 of the processor 102 may store the address of, or "point to," the base address 210a of the subject module 212a. The address field 206 of the status register 202 may point to the address of the instruction of the subject module 212a that is currently executed. As execution of the subject module 212a progresses, the address field 206 is incremented following execution of each instruction and the next instruction is then executed.

Referring specifically to FIG. 4B, while still referring to FIG. 4A, as execution of the subject module 212a progresses, the address field 206 eventually may come to an address location 218 storing a branching instruction. Upon executing the branching instruction, the base register 208 may be changed to point to the base address 210b of a branch module 212b invoked by the branching instruction. In some embodiments, detecting whether an instruction of the subject module 212a is a branching instruction at step 310 of the method 300 may include detecting a change in the value stored in the base register 208.

Referring again to FIG. 3, if an instruction is determined to be a branching instruction or a qualified branching instruction at step 310, then step 312 is executed to determine whether the debug mode is on. This may include evaluating the value of a flag bit of the mode field 204 of the status register 202. If the debugging mode is on, then a trace record is generated at step 314. The trace record may record a portion of the module specified in the branching instruction. For example, the branching instruction may include an address for the function or module being invoked. In certain embodiments, the trace record may include the first N bytes (e.g., 100) following this address. Typically, the first 100 bytes will include an "eye catcher" including one or both of the author and name of the module. The trace record may further include the values of the registers 104 of the processor 102 at the time the branching instruction is executed. The registers 104 may include more than those illustrated in FIG. 2. In some embodiments, the trace record includes the values of the registers at the time the branching instruction is executed and at the time the function or module referenced by the branching returns execution to a calling module or function.

If the debug mode is determined to be off at step 312, then step 316 evaluates whether the branching instruction corresponds to the branching instruction or instructions specified by the configuration parameter. If the result of the inquiry at step 316 is yes, then the debug mode is turned on at step 318 and a trace record is generated for the branching instruction at step 314. Where a user or program has specified that all branching instructions should turn on debug mode, then step 316 may be omitted, and step 318 will be executed for all branching instructions.

The method 300 further includes evaluating at step 320 whether execution has returned to the subject module following detection of a branching instruction corresponding to the configuration parameter.

Figure 4C:
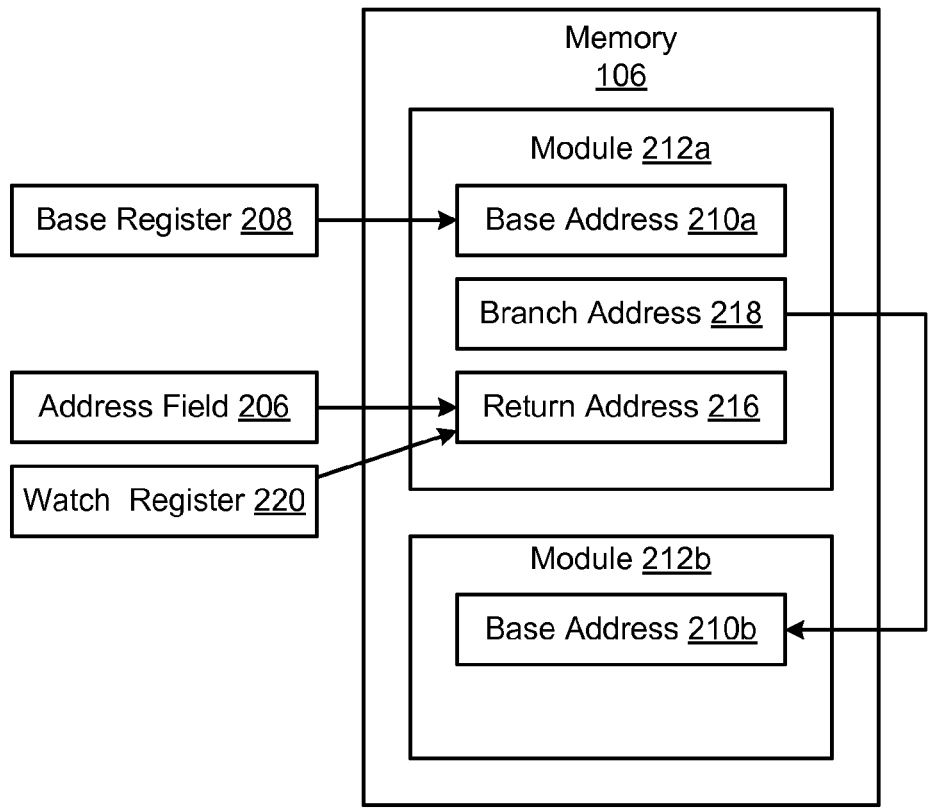

Referring to FIGS. 4B and 4C, while still referring to FIG. 3, the registers 104 of the processor 102 may be used to facilitate detection of return of execution to the subject module at step 320. When the branching instruction at the address 218 is executed, a return address 216 pointing to an instruction following, or immediately following, the branch instruction at address 218 may be stored in the watch register 220. In some embodiments, the value of the return address is stored in the watch register 220 only if the branching instruction stored at address 218 is determined to correspond to the configuration parameter as discussed above with respect to step 316 of the method 300.

Referring to FIG. 4C, upon completion of execution of the branch module 212b, and any modules invoked by the branch module 212b, the base register 208 again is set equal to the base address 210a of the subject module 212a. The status address 206 is set equal to the return address 216 such that execution of the subject module 212a may continue. In some embodiments, detecting return of execution to the subject module 212a at step 320 of the method 300 may include detecting when the value of the watch register 220, which is set to the value of the return address 216 prior to execution of the branch module 212a, is equal to the address field 206 of the status register 202.

Referring again to FIG. 3, if return of execution to the subject module is detected at step 320, then at step 322 debug mode is turned off, such as by changing the value of the debug mode bit in the mode field 204. Then a trace report is generated at step 324. The trace report may include trace records generated at step 314 and may further include a dump of all data in areas of the memory 106 that are addressable by the subject module. As noted above, the trace records generated at step 314 may include the contents of the registers at the time a branching instruction is executed and returns as well as the first N bytes of the function or module invoked as a result of the branching instructions.

The trace records in conjunction with the storage dump enable a user or program to readily identify the modules called following a branching instruction, including those modules that intercept function calls made by the subject module without being specified in the source code or object code of the subject module.

The method 300 may further include evaluating whether the end of the subject module has been reached at step 326. If so, then the method 300 ends. If not, then the monitoring of the execution of the module continues at step 308.

Figure 5:
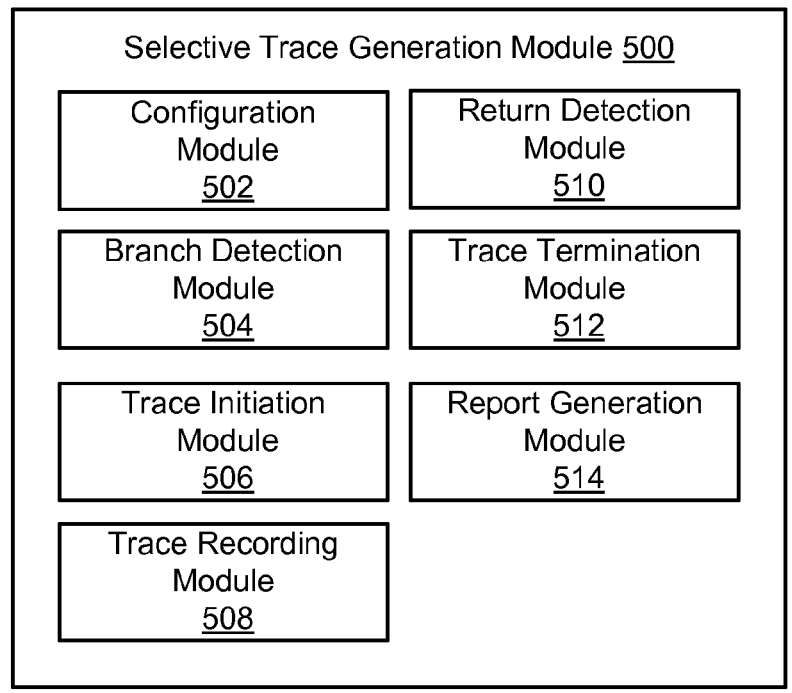
FIG. 5 is a high-level block diagram showing various modules that may be used to implement the methods illustrated in FIG. 3 and FIGS. 4A through 4C.

Referring to FIG. 5, various modules that may be used to implement the methods illustrated in FIG. 3 and FIGS. 4A through 4C are illustrated. As shown, a memory, such as the memory 106 storing the subject module 212a, may store a selective trace generation module 500. Alternatively, all or part of the selective trace generation module 500 may be stored in a different memory and executed by a processor other than the processor 102 executing the subject module 212a.

The trace generation module 500 may include one or more of a configuration module 502, branch detection module 504, trace initiation module 506, trace recording module 508, return detection module 510, trace termination module 512, and report generation module 514.

The configuration module 502 reads a configuration parameter for determining which branching instructions are to be used to turn on trace generation. The configuration parameter may specify one or more instructions that will be used to initiate the generation of trace data during execution of the subject module. The configuration parameter may be read from a file or specified as a parameter when the subject module is invoked, when a debugging program is invoked, or at some point during execution of either the subject module or debugging program. In yet another embodiment, the configuration parameter may be an environment variable of an operating environment such as a shell or operating system in which the module or debugging program executes.

The configuration module 502 may evaluate the configuration parameter to determine whether the configuration parameter is a branch instruction. A branching instruction may include an instruction invoking another module, an instruction invoking a segment of a multi-segment subject module, or an instruction invoking a function within the subject module. In some embodiments, only certain types of branching instructions may be suitable for generating trace data. Accordingly, in such embodiments, the configuration module may evaluate the configuration parameter to determine if the configuration parameter is both a branching instruction and a qualified branching instruction.

If the configuration module 502 determines that a qualified branching instruction has been specified by the configuration parameter, it may invoke the branch detection module 504. The branch detection module 504 may be configured to detect execution of a branching instruction within a currently executing module. The branch detection module 504 may detect execution of a branching instruction by detecting a change in a value of the base register 208. If the debugging mode is not currently on and the branching instruction is determined to correspond to the configuration parameter, then the branch detection module 504 may invoke the trace initiation module 506. The trace initiation module 506 may turn on the debugging mode, such as by changing the value of a bit in the mode field 204 of the status register 202. The trace initiation module 506 may also store the return address of the subject module in the watch register 220 to facilitate return detection. The trace initiation module 506 may also invoke the trace recording module 508 to generate a trace record of the branch module invoked by the branching instruction that triggered invocation of the trace initiation module 506, i.e. the branch instruction corresponding to the configuration parameter.

If debugging mode is turned on, then the branch detection module 504 may invoke the trace recording module 508 to generate a trace record. In some embodiments, the branch detection module 504 invokes the trace recording module 508 only for qualified branching instructions that correspond to one or more values specified in one or more configuration parameters, a system preference, or a hard coded subset of branching instructions that are specified to be qualified branching instructions.

The trace recording module 508 may generate trace records including at least a portion of the module specified in the branching instruction. For example, the branching instruction may include an address for the function or module being invoked. The trace record may include the first N bytes (e.g. 100) following this address. Typically, the first 100 bytes will include an "eye catcher" including one or both of the author and name of the module. The trace record may further include the values of the registers 104 of the processor 102 at the time the branching instruction is executed. The registers 104 may include more than those illustrated in FIG. 2. In some embodiments, the trace record includes the values of the registers at the time the branching instruction is executed and at the time the function or module referenced by the branching returns execution to a calling module or function.

The return detection module 510 determines when execution has returned to the subject module following a branching instruction corresponding to the configuration parameter. The return detection module 510 may do so by comparing a value stored in the address field 206 of the status register 202 to the return address stored in the watch register 220 by the trace initiation module 508. When the return detection module 510 detects return of execution to the subject module, it may invoke the trace termination module 512. The trace termination module 512 turns off the debugging mode such that subsequent instructions that do not correspond to the configuration parameter will not generate a trace record. The trace termination module 512 may turn off debugging mode by changing the value of a bit in the mode field 204 of the status register 202.

The return detection module 510 may further invoke a report generation module 514 that compiles trace records generated by the trace recording module 508 between the time that the trace initiation module 506 turns the debugging mode on and the time that the trace termination module 512 turns debugging mode off. The report may further include a dump of data stored in the memory 106 at the time return of execution to the subject module is detected by the return detection module 510. Alternatively, the report may only include data stored in common areas of memory addressable by the subject module.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for selectively tracing program execution, the method comprising:
  executing a first module on a processor, the processor operably coupled to a memory storing the first module and at least one branch module;
  detecting execution of an instruction of the first module to execute a branch module;
  in response to detecting execution of the instruction, turning on a debugging mode to generate traces of branch modules subsequently executed by the processor;
  detecting return of execution by the processor to the first module, wherein detecting the return of execution by the processor comprises detecting equality of a value stored in a status register and a return address of the first module, the status register indicating an address of an instruction currently executed by the processor; and
  in response to detecting return of execution to the first module, turning off the debugging mode to terminate the generation of traces.

2. The method of claim 1, wherein detecting execution of the instruction comprises detecting a change in a value of a base register, the base register operably coupled to the processor and storing a base address of a currently executing module.

3. The method of claim 1, wherein detecting execution of the instruction further comprises detecting correspondence between the instruction and a branch instruction identified by a configuration parameter.

4. The method of claim 1, further comprising:
  storing the return address in a watch register operably coupled to the processor; and
  detecting the return of execution by the processor to the first module by detecting equality of the values stored in the watch register and the status register.

5. The method of claim 1, wherein generating traces comprises storing in a trace record a first N bytes of the branch modules.

6. The method of claim 5, wherein the trace record includes values stored in at least one register operably coupled to the processor.

7. The method of claim 1, further comprising generating a trace report, the trace report including the traces and a record of data stored in portions of the memory addressable by the first module.

8. The method of claim 1, wherein generating traces comprises setting a flag in a status register operably coupled to the processor, the flag instructing the processor to generate trace records of subsequent branch modules executed by the processor.

9. An apparatus for selectively tracing program execution, the apparatus comprising:
  at least one processor;
  at least memory device coupled to the at least one processor and storing modules for execution on the at least one processor, the modules comprising:
    an execution module to execute a first module on a processor, the processor operably coupled to a memory storing the first module and at least one branch module;
    a branch detection module to detect execution of an instruction of the first module to execute a branch module;
    a trace initiation module to turn on a debugging mode to generate traces of branch modules executed by the processor in response to detection of the instruction;
    a return detection module to detect return of execution by the processor to the first module by detecting equality of a value stored in a status register and a return address of the first module, the status register indicating an address of an instruction currently executed by the processor; and
    a trace termination module to turn off the debugging mode and thereby terminate the generation of traces in response to detecting return of execution to the first module.

10. The apparatus of claim 9, wherein the branch detection module is further configured detect execution of the instruction by detecting a change in a value of a base register, the base register operably coupled to the processor and storing a base address of a currently executing module.

11. The apparatus of claim 9, wherein the detection module is further configured to detect execution of the instruction by detecting correspondence between the instruction and a branch instruction identified by a configuration parameter.

12. The apparatus of claim 9, wherein the return detection module is further configured to:
store the return address in a watch register; and
detect the return of execution of the processor to the first module by detecting correspondence between values stored in the watch register and the status register.

13. The apparatus of claim 9, wherein the trace initiation module is configured to initiate the generation of traces by setting a flag in a status register operably coupled to the processor, the flag instructing the processor to generate trace records of subsequent branch modules executed by the processor.

14. A computer program product for selectively tracing program execution, the computer program product comprising a non-transitory computer-readable storage medium having computer-usable program code embodied therein, the computer-usable program code comprising:
computer-usable program code to execute a first module on a processor, the processor operably coupled to a memory storing the first module and at least one branch module;
computer-usable program code to detect execution of an instruction of the first module to execute a branch module;
computer-usable program code to turn on a debugging mode to generate traces of branch modules executed by the processor in response to detecting execution of the instruction;
computer-usable program code to detect return of execution by the processor to the first module by detecting equality of a value stored in a status register and a return address of the first module, the status register indicating an address of an instruction currently executed by the processor; and
computer-usable program code to turn off the debugging mode and thereby terminate the generation of traces in response to detecting return of execution to the first module.

15. The computer program product of claim 14, further comprising computer-usable program code to detect execution of the instruction by detecting a change in a value of a base register, the base register operably coupled to the processor and storing a base address of a currently executing module.

16. The computer program product of claim 14, further comprising computer-usable program code to detect execution of the instruction by detecting correspondence between the instruction and a branch instruction identified by a configuration parameter.

17. The computer program product of claim 14, further comprising computer-usable program code to initiate generation of traces by setting a flag in a status register operably coupled to the processor, the flag instructing the processor to generate trace records of subsequent branch modules executed by the processor.

* * * * *